(12) United States Patent
Reismann et al.

(10) Patent No.: US 12,315,892 B2
(45) Date of Patent: May 27, 2025

(54) TIGHTNESS TEST OF A LIQUID FILLED TEST OBJECT

(71) Applicant: INFICON GmbH, Cologne (DE)

(72) Inventors: Maximilian Reismann, Cologne (DE); Daniel Wetzig, Cologne (DE)

(73) Assignee: INFICON GmbH, Cologne (DE)

( * ) Notice: Subject to any disclaimer, the term of this patent is extended or adjusted under 35 U.S.C. 154(b) by 314 days.

(21) Appl. No.: 17/436,986

(22) PCT Filed: Jul. 22, 2020

(86) PCT No.: PCT/EP2020/070661
§ 371 (c)(1),
(2) Date: Sep. 7, 2021

(87) PCT Pub. No.: WO2021/023513
PCT Pub. Date: Feb. 11, 2021

(65) Prior Publication Data
US 2022/0181709 A1   Jun. 9, 2022

(30) Foreign Application Priority Data

Aug. 8, 2019  (DE) .......................... 102019121462.9

(51) Int. Cl.
*G01M 3/20*  (2006.01)
*H01M 10/0525*  (2010.01)
*H01M 10/42*  (2006.01)

(52) U.S. Cl.
CPC ....... *H01M 10/4228* (2013.01); *G01M 3/202* (2013.01); *H01M 10/0525* (2013.01); *H01M 2300/0025* (2013.01)

(58) Field of Classification Search
CPC ............ G01M 3/202; H01M 10/4228; H01M 10/0325; H01M 2300/0025
(Continued)

(56) References Cited

U.S. PATENT DOCUMENTS

| 5,131,263 A | 7/1992 | Wetzig et al. |
| 2001/0016278 A1* | 8/2001 | Onishi .............. H01M 10/4285 429/185 |

(Continued)

FOREIGN PATENT DOCUMENTS

| CN | 1519548 A | 8/2004 |
| CN | 101151514 A | 3/2008 |

(Continued)

*Primary Examiner* — Alexander A Mercado
*Assistant Examiner* — Rodney T Frank
(74) *Attorney, Agent, or Firm* — Kirton McConkie; Whitney Blair

(57) ABSTRACT

A method for a tightness test of a test object filled with a liquid, said test object having an internal pressure which is lower than atmospheric pressure, comprising the following steps: inserting the test object into a test chamber, evacuating the test chamber to a pressure which is lower than the internal pressure inside the test object, drawing off the test chamber residual gas components together with gas components desorbing from a wall of the test chamber and parts of the liquid escaping from the test object through a leak in the latter without any carrier gas being fed to the test chamber from outside, transporting the drawn-off residual gas components together with the parts of the liquid escaped from the test object to a detector, and detecting parts of the liquid escaped through a leak in the test object by means of a detector.

14 Claims, 2 Drawing Sheets

(58) Field of Classification Search
USPC .............................................................. 73/40
See application file for complete search history.

(56) References Cited

U.S. PATENT DOCUMENTS

| | | |
|---|---|---|
| 2013/0199274 A1 | 8/2013 | Yamamoto et al. |
| 2014/0322565 A1* | 10/2014 | Kusama .............. H01M 50/191 |
| | | 429/185 |
| 2017/0108401 A1 | 4/2017 | Wetzig et al. |

FOREIGN PATENT DOCUMENTS

| | | |
|---|---|---|
| CN | 103210293 A | 7/2013 |
| CN | 103649709 A | 12/2016 |
| CN | 109073615 A | 12/2018 |
| CN | 106716097 A | 6/2019 |
| CN | 108474715 A | 3/2020 |
| DE | 102014224799 A1 | 6/2016 |
| EP | 1522838 B1 | 9/2010 |
| EP | 2447694 | 10/2010 |
| JP | 2001-236986 A | 8/2001 |
| JP | 2013-182722 A | 9/2013 |
| JP | 2014-533825 A | 12/2014 |
| JP | 2016-195042 A | 11/2016 |
| WO | 2005/054806 A1 | 6/2005 |

\* cited by examiner

TIGHTNESS TEST OF A LIQUID FILLED TEST OBJECT

RELATED APPLICATIONS

This application is a National Stage of International Application No. PCT/EP2020/070661, filed Jul. 22, 2020, and entitled TIGHTNESS TEST OF A LIQUID-FILLED TEST OBJECT, which claims priority to German Patent Application No. DE 10 2019 121 462.9, filed Aug. 8, 2019, which are each incorporated herein by reference in their entirety.

SUMMARY

It is an object of the invention to provide a leak detection method for a liquid-filled test object whose internal pressure is lower than or equal to atmospheric pressure.

The method according to the invention is defined by the features of claim 1.

Accordingly, a liquid-filled test object is inserted into a test chamber. The liquid is contained inside the test object. The internal pressure inside the test object is lower than or equal to atmospheric pressure. After insertion of the test object into the test chamber, the test chamber is evacuated to a pressure below the internal pressure in the test object and below atmospheric pressure. Residual gas components contained in the test chamber are drawn off together with gas components desorbed from at least one test chamber wall and any parts of the liquid which travel into the test chamber through a leak in the test object and are fed to a detector without any carrier gas being fed to the test chamber. Parts or particles of the liquid escaping from the test object are selectively detected by a detector.

It is of particular importance to the invention that no carrier gas is fed to the test chamber from outside that comes from a carrier gas source connected to the test chamber or is taken in from the environment of the test chamber. Here, in particular no gas flow exists which passes along the surface of the test object. Rather, the parts or particles of the liquid escaping from the test object are drawn off the test chamber together with the residual gas components and fed to the detector. A carrier gas is not required.

The parts of the liquid escaped through the leak can be molecular particles in an evaporated form. The evaporation can take place while the parts escape from the test object. Typically, the liquid evaporates at the outlet of the leak channel which extends through the leaky wall of the test object. The liquid can have a vapor pressure which is lower than 500 mbar at room temperature (ap-proximately 15° C. to 25° C.). In particular, the test object can be a battery, such as e.g. a lithium ion battery, and the liquid can be an electrolyte, such as dimethyl carbonate, for example.

The test chamber can be configured as a rigid test chamber having rigid walls. Alternatively, the test chamber can be configured as a film chamber which is characterized by comprising at least one flexible wall area which, during evacuation, is drawn to the test object thus reducing the volume of the film chamber. Furthermore, film chambers in particular having walls completely made up of a flexible film offer the advantage that the walls drawn to the test object support the test object, which is in particular advantageous in the case of a flexible test object.

The detector comprises a sensor which selectively detects the parts or particles to be detected of the liquid and can thereby differentiate them from other parts or gases. The parts of the escaped liquid can be in a liquid form and fed to the detector in such a form. The detector must be capable of analyzing liquids and selectively detecting the liquid contained in the test object. The es-caped liquid can be fed to the detector in the form of a mist or aerosols, for example.

Alternatively, it can be provided that the liquid evaporates while it escapes through a leak in the test object and the escaped parts of the liquid are fed to the detector in the evaporated form, i.e. in the gaseous phase. In this case the detector must be configured as a gas detector and must be capable of analyzing gases and selectively differentiating the liquid in its gaseous phase in the test object from other gases. Here, it is crucial that the liquid contained in the test object performs the transition from the liquid phase to the gaseous phase only when leaving the test object, i.e. outside the test object or in the opening or the channel of the leak. Thus, no gas present in the test object is used as a test gas since the liquid inside the test object is in its liquid form even when the liquid escapes through a leak and evaporates.

The detector for the parts to be detected of the liquid can be a gas detector, such as e.g. a mass spectrometer, a gas chromatograph, an infrared radiation absorption detector or a detector having chemical sensors or semiconductor sensors.

No carrier gas is supplied to the test chamber. In particular, no constant carrier gas flow is fed to the test chamber as in conventional carrier gas methods for gas leak detection. Rather, the residual gas components inside the test chamber and the gas components desorbing from the test chamber walls are used for transporting parts and particles of the liquid traveling into the test chamber through a leak in the test object to the detector. Thus, a mixture of gas components from inside the test chamber or from the test chamber walls and parts or particles of the liquid contained in the test object are fed to the detector and analyzed with the aid of the detector for detecting the parts of the liquid transported by the gas.

Preferably, the gas flow transporting the parts of the liquid is fed to the detector only when a pressure limit value in the test chamber or the connecting line between the test chamber and the vacuum pump evacuating the test chamber is reached. This pressure limit value can range between approximately 2 mbar and 50 mbar and is preferably lower than 20 mbar. The vacuum pump which preferably is a membrane pump can be connected to the test chamber and/or to the gas line connecting the vacuum pump and the test chamber via a valve. At the beginning of the evacuation of the test chamber the valve is closed. When the pressure limit value is reached, the valve is opened and a partial flow travels to the detector, while the remaining main gas flow continues to be drawn off by the membrane pump. Here, in particular when a vacuum pump configured as a membrane pump is used, an accumulation of the liquid parts escaping from a leak is attained in contrast to a conventional carrier gas method. When the pressure limit value is reached the liquid parts accumulated so far are fed to the detector.

Preferably, it is provided that the test object in the test chamber is flushed with a flushing gas for removing parts of the liquid adhering to the test object. Preferably, the test object is flushed with a flushing gas before the actual leak detection takes place, e.g. before the evacuation of the test chamber.

It is conceivable that the parts of the liquid escaped through a leak accumulate inside the test chamber or in the connecting line during a period of time before the parts of the liquid or the mixture of residual gas and parts of the liquid are fed to the detector for analyzing purposes.

A calibration can be performed with the aid of a test leak filled with a test liquid. The test leak can be configured as a capillary leak where the test liquid escapes through a capillary defined in the wall of the test leak having known dimensions. Alternatively, the test leak can be a permeation liquid leak where an area of the wall of the test leak is configured as a membrane having known permeation characteristics for the test liquid. With the aid of such a calibration the correlation between the amount of the detected parts of the liquid and the size of the leak can be determined and archived such that during the actual leak detection not only the existence of a leak can be determined but also its size.

According to the invention, it can in particular be provided that the size of the leak is determined on the basis of the detection of the parts of the liquid es-caped through a leak.

BRIEF DESCRIPTION OF THE SEVERAL VIEWS OF THE DRAWINGS

Hereunder two exemplary embodiments of the invention will be explained in detail with reference to the drawings in which.

DETAILED DESCRIPTION

Figure 1:
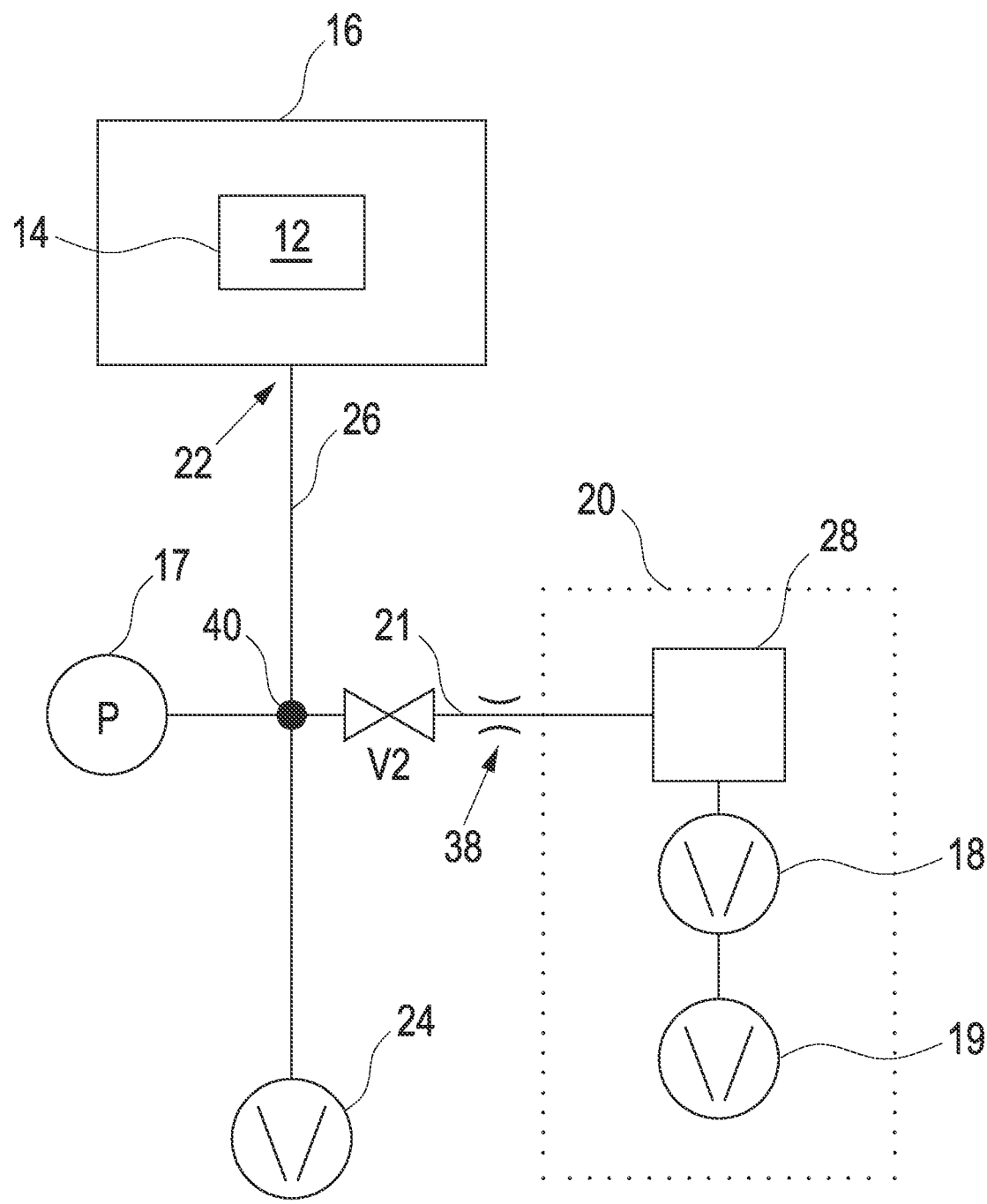
FIG. 1 shows a block diagram of a first exemplary embodiment.

The invention relates to a method for a leakage detection on a liquid-filled test object.

Various methods for an industrial tightness test are known where a test object filled with a test gas is subjected to a negative pressure in a test chamber by evacuating the test chamber. Due to the resultant pressure difference the test gas travels into the test chamber through a possibly existing leak in the test object from where it is fed to a sensor for detecting the test gas. For example, for performing a leakage test food packages are actively filled with a test gas, such as e.g. helium, and subsequently inserted into the test chamber. Alternatively, methods are known where gases are used as test gas which are already contained in the test object when the latter is inserted into the test chamber. In this case active filling of the test object with a test gas is not required.

Such a method is described in DE 10 2014 224 799 A1, for example. The gas already contained in the test object when the latter is inserted into the film chamber can be components of air, such as e.g. nitrogen, oxygen or carbon dioxide. Further, such gases can be used as test gas which contain aromatic substances of a product contained in the test object or made up of these sub-stances, such as e.g. aromatic substances of coffee in the case of coffee. Another possibility is to use such gases as test gas which are produced by a product contained in the test object, such as food. In the case of coffee this can be $CO_2$ which is produced in a coffee package within a few hours.

On the other hand, the invention relates to the leakage detection on a liquid-filled test object where no gas to be used as test gas is present in the test object and which should not or cannot be actively filled with a separate test gas. This applies to batteries, for example, which are filled with electrolytic liquids, such as a lithium ion battery filled with dimethyl carbonate as an electrolyte.

In the methods described above which are based on the principle of detecting gases flowing outward from inside the test object, the escaping gas is frequently detected with the aid of a gas detector. Here, the test object is tested for tightness by means of the vacuum method. For tightness testing, the test object is inserted into a vacuum chamber. Gas escaping into the vacuum chamber through a leak in the test object is continuously discharged from the vacuum chamber by means of the vacuum system. The leakage gas is selectively detected in the vacuum system using a suitable sensor. At a sufficiently low pressure the leakage gas moves sufficiently fast to the sensor by diffusion or in a molecular manner.

As an alternative to the methods described above which are based on the principle of detection of gases flowing outward from the inside of the test object, it is known to feed the escaped gas to the gas detector with the aid of a carrier gas. The carrier gas method is in particular applied when the operating pressure in the vacuum chamber is much higher than 1 mbar. In such cases the diffusion velocity of the leakage gas to be detected in the vacuum chamber is too low. Such a carrier gas method is described in WO 2005/054806 A1, for example, where a carrier gas flow passes through a test chamber containing a test object. The test chamber is flushed with the carrier gas. Test gas escaping from the test object is transported out of the test chamber by the carrier gas flow and fed to a test gas sensor.

In the refrigeration/air conditioning industry it is known to check objects filled with a liquid refrigerant—e.g. heat exchangers—for tightness. The special feature of such test objects is that the liquid refrigerant in the test object is at a negative pressure for obtaining the liquid phase of the refrigerant. For the tightness test of such test objects filled with a liquid refrigerant a sniffing probe passes along the areas of the test object which are to be tested for tightness, said sniffing probe drawing in a refrigerant which escapes to the outer atmosphere through a leak and evaporates, and feeding it to a gas detector. The sniffing probe draws in air from the environment of the test object and, in doing so, absorbs escaping leakage gas which is selectively detected by an appropriate sensor and differentiated from the drawn-in air components.

The sniffing leak detection method is not applicable to a liquid-filled test object whose internal pressure is lower than atmospheric pressure in the outer environment of the test object (e.g. an internal pressure in the range of approximately 50-500 mbar) since in the case of a leak no leakage gas escapes to the outside. For example, in the case of batteries filled with a liquid electrolyte having a low vapor pressure and in which a negative pressure exists, air enters the inside of the test object from the outer environment of the test object if leaks exist. The leak is not detectable with the aid of a sniffing probe.

The leak detection methods described above using a test gas contained in the test object are not applicable either or are at least inexact since the liquid in the test object enters the opening or the channel of the leak when the outer environment of the test object is evacuated, and escaping of a test gas is pre-vented or at least considerably affected. An amount of test gas detected out-side the test object is then not representative of the existence or the size of a leak in the test object.

EP 1 522 838 B1 describes a method where a test object filled with an electrolyte in contained in a test chamber whose internal pressure is lower than the pressure inside the test object. Clean air or ambient air as a carrier gas is fed to the test chamber in order to feed liquid components escaping from the test object to a detector in accordance with the carrier gas method.

In the two exemplary embodiments, a test object 14 filled with a liquid 12 is contained in a test chamber 16. The test object 14 is a battery filled with a liquid electrolyte. In the present exemplary embodiments, the test chamber 16 is a conventional rigid test chamber.

The test chamber 16 is provided with a vacuum connection 22 to which a vacuum pump 24 is connected by means of which the test chamber 16 can be evacuated. For this purpose, the vacuum pump 24 comprises at least one vacuum pump configured as a membrane pump. The test chamber 16 and the vacuum pump 24 are connected to each other in a gas-conducting manner by a connecting line 26 such that the vacuum pump 24 can draw gas off the test chamber 16 via the connecting line 26.

The connecting line 26 connecting the vacuum pump 24 to the test chamber 16 has connected thereto a detector 28 for analyzing and detecting parts of the liquid 12. In both exemplary embodiments, the detector 28 is a selective gas detector configured as a mass spectrometer, for example, whose sensor selectively detects molecular parts of the liquid 12 and can differentiate them from other gases. The detector 28 forms part of a mass-spectrometric vacuum system 20 which comprises a forevacuum pump 19 and a high-vacuum pump 18 for evacuating the mass spectrometer 28.

The detector 28 is connected in a gas-conducting manner to the connecting line 26 via a gas-conducting detection line 21. The detection line 21 is provided with a throttle 38 for throttling the gas flow branched off the connecting line 26 and a valve V2 for selectively closing the detection line 21. For measuring the pressure inside the connecting line 26, the latter is connected in a gas-conducting manner to a pressure sensor 17.

Parts of the liquid 12 escape from a leak in the test object 14 and travel into the test chamber 16. When the liquid 12 escapes from the test object 14, said liquid can evaporate such that the escaped parts of the liquid 12 can be present in gaseous form.

The detector 28 is operated as a mass spectrometer in the vacuum system 20 at a pressure which is lower than the pressure inside the vacuum chamber 16 and lower than the pressure at the connecting point 40 between the connecting line 26 and the detection line 21. However, in the case of the membrane pump 24 used for evacuating the test chamber 16 according to the invention, no high vacuum is generated inside the test chamber 16. Rather, the mem-brane pump 24 generates a pressure in the range of a few millibars. The mem-brane pump 24 draws off residual gas components still present in the test chamber 16. Furthermore, when a pressure in the range of approximately 10 mbar is reached inside the test chamber 16, gas components desorb from the walls of the test chamber, which gas components are also drawn off by the membrane pump 24. These gas components, i.e. residual gas components from the test chamber 16 and gas components desorbing from its walls, take up parts of the liquid 12 escaping from the test object 14 through a leak and traveling into the test chamber 16. These parts of the liquid 12 are fed to the detector 28.

The vacuum pressure inside the test chamber 16 after the evacuation is a few millibars. The diffusion of the parts of the liquid 12 which escape from the test object 14 and evaporate is still inert at this pressure. The transport of the es-caped parts of the liquid 12 to the detector 28 is accelerated by the gas com-ponents, without any carrier gas being used and fed to the test chamber 16 from outside.

Alternatively, it is conceivable that the liquid parts escaped from the test object 14 accumulate inside the test chamber 16 or inside the connecting line 26 be-fore the parts of the escaped liquid 12 are fed to the detector 28. For this purpose, it is conceivable that between the connecting point 40 and the mem-brane pump 24 a valve not illustrated in FIG. 1 is provided which is closed when a sufficient vacuum pressure inside the test chamber 16 is reached in order to cause an accumulation of the escaped liquid parts inside the test chamber 16 or in the connecting line 26 between the test chamber 16 and the valve not illustrated, before the detection takes place. The valve V2 can be opened for detecting purposes. During the accumulation phase the valve V2 can be open or closed.

Figure 2:
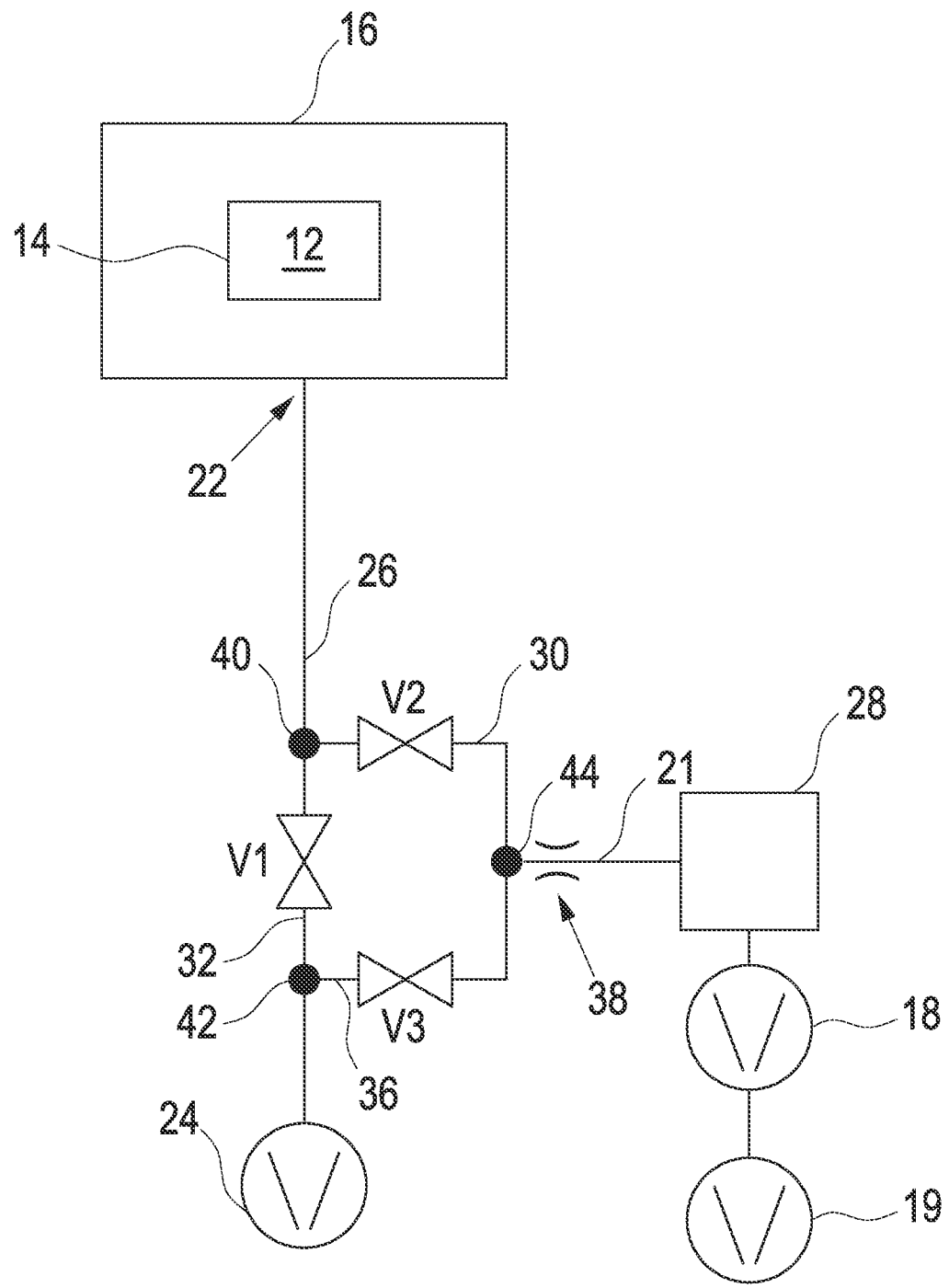
FIG. 2 shows a block diagram of a second exemplary embodiment.

The exemplary embodiment illustrated in FIG. 2 differs from the first exemplary embodiment of FIG. 1 in that the portion 30 of the detection line 21 comprising the valve V2 is bridged by a portion 36 comprising another valve V3 such that the valves V2, V3 are connected in parallel. In the portion 32 of the connecting line 26 a valve V1 is provided between the connecting point 40 of the connecting line 26 and the portion 30 as well as the connecting point 42 between the connecting line 26 and the portion 36. For the purpose of evacuating the test chamber 16 the valve V1 is opened. Then the valve V2 is closed. The same ap-plies to the valve V3. When the valves V2, V3 are closed and the valve V1 is open the vacuum pump 24 only evacuates the test chamber 16. The detector 28 according to the second exemplary embodiment is also a mass spectrometer having an independent vacuum system. The inlet area to the mass spectrometer is also evacuated via the vacuum pump 24. For this purpose, the valve V2 remains closed, while the valve V1 is closed and the valve V3 is opened for evacuating the inlet area to the mass spectrometer to the required vacuum pressure. After the evacuation the valve V1 is closed and the valves V2 and V3 are opened for the measuring operation such that the measuring medium is transported out of the test chamber 16 via the vacuum pump 24 and past the detector 28.

If a leak exists in the test object 14, parts of the liquid 12 contained in the test object 14 travel into the test chamber 16. The liquid can be dimethyl carbonate used as an electrolyte in a lithium ion battery. In the lithium ion battery, a vacuum pressure exists which is higher than the pressure inside the test chamber 16 in the area outside the test object 14 after the test chamber 16 has been evacuated. The liquid electrolyte evaporates when it escapes from the test object 14 through a leak such that the parts to be detected of the liquid 12 can be present in the form of molecular particles of a gaseous phase.

The parts of the liquid 12 are transported through the test chamber 16 and to the detector 28 via the lines 26, 30, 21 and further fed to the pump 24 via the line 36. Here, a mixture of gas components coming from the inside of the test chamber 16 and/or the walls of the test chamber 16 and transported parts of the liquid 12 is produced. The selective sensor of the mass-spectrometric detector 28 detects the parts of the liquid 12 and is capable of differentiating them from the gas components of the test chamber 16. The detection of the parts of the liquid 12 escaped through the leak of the test object 14 indicates the existence of a leak in the test object. The amount of the detected parts of the liquid 12 can indicate the size of a leak.

Furthermore, the parts of the liquid 12 escaping through a leak in the test object 14 can accumulate inside the test chamber 16 before the detection takes place. For this purpose, the valves V1, V3 are closed during the accumulation phase. During the accumulation phase the valve V2 can also be closed. When a preset time has elapsed the valve V2 is opened such that the accumulated parts of the liquid 12 are fed to the detector 28.

The accumulated gas can also be transported by the gas components from the test chamber 16 to the detector 28 after the accumulation phase. Here, no carrier gas is fed to the evacuated test chamber 16 from outside. With the test chamber 16 being closed, it is waited until parts of the liquid 12 have accumulated in the test chamber 16 within a predefined time period. With the aid of the vacuum pumps 18, 19 the detector 28 is set to a lower pressure than the pressure existing in the test chamber 16. When the valve V2 is opened the ac-cumulated parts of the liquid 12 are transported to the detector 18 and detected there.

The conductance value of the throttle 38 and the threshold value of the pressure in front of (left-hand side in the Figures) the throttle 38 at which the valve V2 is opened are selected such that the gas inlet into the chamber volume of the mass spectrometer 28 via the throttle 38 causes a pressure in-crease of not more than 10-4 mbar. Preferably, the pressure threshold value under laboratory conditions is approximately 5 mbar.

The mass spectrometer 28 generates a signal on a measuring mass characteristic of a characteristic component of the liquid 12 (electrolyte component). The measuring signal is compared with a threshold value, wherein, when the threshold value is exceeded, it is assumed that a leak is present in the test object 14. After the measurement the valve V2 is closed, the test chamber is vented and the test object 14 is removed from the test chamber 16, where appropriate.

The method according to the invention does not require any high-grade vacuum pump for evacuating the test chamber 16, such as e.g. a high-vacuum pump, but merely a simple vacuum pump, such as e.g. a membrane pump, which can reach a final pressure of less than 10 mbar.

An essential difference between the two exemplary embodiments is that in the exemplary embodiment of FIG. 2, after the valve V1 has been closed and the valves V2, V3 have been opened when the set pressure threshold value has not been reached, a shorter distance must be traveled from the throttle 38 to the mass spectrometer 28 than in the exemplary embodiment of FIG. 1. In the area between the throttle 38 and the mass spectrometer 28 the pressure inside the detection line 21 is low, namely lower than 10-4 mbar, such that molecularly free movement conditions for the gas exist in this area. The time period of the dispersion of the gas up to the mass spectrometer 28 is thus negligible.

On the side of the throttle 38 facing away from the mass spectrometer, i.e. on the left-hand side of the throttle 38 in the Figures, the pressure in the lines 26, 30, 32, 36 is 5 mbar, for example. Here, viscous flow conditions prevail, whereby the measuring gas must diffuse through the residual gas along this distance, which leads to a time delay. In FIG. 1 this diffusion distance from the connecting point 40 between the connecting line 26 and the vacuum line 21 to the throttle 38 is longer than the diffusion distance in FIG. 2 between the connecting point 44 of the lines 30, 36, 21 and the throttle 38.

The invention claimed is:

1. A method for a tightness test of a test object, the method comprising:
    obtaining a test object that is filled with a liquid but is not filled with a test gas;
    inserting the test object into a test chamber, the test object having an internal pressure which is lower than atmospheric pressure such that the liquid with which the test object is filled is subject to the internal pressure that is lower than atmospheric pressure;
    without feeding a carrier gas into the test chamber, and while the test object remains filled with the liquid but not filled with the test gas, evacuating the test chamber to a pressure which is lower than the internal pressure inside the test object to thereby cause parts of the liquid to escape from the test object through a leak channel in a wall of the test object and to cause the liquid to evaporate to become the test gas upon escaping through the leak channel and be drawn off with residual gas components from the test chamber together with residual gas components that desorb from a wall of the test chamber;
    transporting, to a detector, the drawn-off residual gas components together with the test gas; and
    using the detector to detect the test gas.

2. The method according to claim 1, wherein the parts of the liquid evaporate to become the test gas at an outlet of the leak channel.

3. The method according to claim 1, wherein the liquid has a vapor pressure of less than 500 mbar at room temperature.

4. The method according to claim 1, wherein the test object is a battery and the liquid is an electrolyte.

5. The method according to claim 1, wherein the test chamber is a rigid test chamber or a film chamber.

6. The method according to claim 1, wherein the detector comprises a selective sensor for the test gas to be detected.

7. The method according to claim 6, wherein the detector is one of a mass spectrometer, a gas chromatograph, an infrared absorption detector or a detector having chemical or semiconductor sensors.

8. The method according to claim 1, wherein the detector is operated in a vacuum system having a lower pressure than the pressure inside the test chamber.

9. The method according to claim 1, wherein the drawn-off residual gas components together with the test gas are transported to the detector only when a predefined pressure limit value has been reached in the test chamber.

10. The method according to claim 9, wherein the pressure limit value is lower than 10 mbar.

11. The method according to claim 9, wherein the detector is connected to the test chamber via a valve which is closed at the beginning of the evacuation of the test chamber and is opened only when the pressure limit value has been reached.

12. The method according to claim 1, wherein the test object is flushed with a flushing gas after insertion into the test chamber.

13. The method according to claim 1, further comprising: allowing the test gas to accumulate in the test chamber or in a connecting line during a time period before using the detector to detect the parts of the liquid.

14. The method according to claim 1, wherein before the test object is inserted into the test chamber the detector is calibrated with the aid of a test leak containing a test liquid by inserting the test leak into the test chamber, evacuating the test chamber and detecting parts of the test liquid escaping through the test leak by means of the detector.

* * * * *